(12) United States Patent
Pastouret et al.

(10) Patent No.: US 8,259,389 B2
(45) Date of Patent: Sep. 4, 2012

(54) AMPLIFYING OPTICAL FIBER AND METHOD OF MANUFACTURING

(75) Inventors: Alain Pastouret, Massy (FR); Ekaterina Burov, Boulogne-Billancourt (FR); David Boivin, Longjumeau (FR); Christine Collet, Mennecy (FR); Olivier Cavani, Angervilliers (FR)

(73) Assignee: Draka Comteq, B.V., Amsterdam (NL)

( * ) Notice: Subject to any disclaimer, the term of this patent is extended or adjusted under 35 U.S.C. 154(b) by 485 days.

(21) Appl. No.: 12/617,316

(22) Filed: Nov. 12, 2009

(65) Prior Publication Data

US 2010/0118388 A1   May 13, 2010

Related U.S. Application Data

(60) Provisional application No. 61/119,963, filed on Dec. 4, 2008.

(30) Foreign Application Priority Data

Nov. 12, 2008  (EP) .................................... 08291059

(51) Int. Cl.
- *H01S 3/067* (2006.01)
- *H01S 3/14* (2006.01)
- *G02B 6/02* (2006.01)
- *C03C 13/04* (2006.01)

(52) U.S. Cl. ..................... 359/342; 359/341.1; 385/142; 385/127; 977/950

(58) Field of Classification Search .............. 359/341.1, 359/341.5, 342; 385/127, 142; 977/950, 977/951

See application file for complete search history.

(56) References Cited

U.S. PATENT DOCUMENTS

| | | | |
|---|---|---|---|
| 4,838,643 A | 6/1989 | Hodges et al. |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |

(Continued)

FOREIGN PATENT DOCUMENTS

EP   1917702 A2   5/2008

(Continued)

OTHER PUBLICATIONS

U.S. Appl. No. 12/098,804 for a "Transmission Optical Fiber Having Large Effective Area," Sillard et al., filed May 6, 2009.

(Continued)

*Primary Examiner* — Mark Hellner
*Assistant Examiner* — Ari M Diacou
(74) *Attorney, Agent, or Firm* — Summa, Additon & Ashe, P.A.

(57) ABSTRACT

Disclosed is an amplifying optical fiber having a central core and an optical cladding surrounding the central core. The central core is based on a silica matrix that includes nanoparticles, which are composed of a matrix material that includes doping ions of at least one rare earth element. The amplifying optical fiber can be employed, for example, in an optical amplifier and an optical laser.

29 Claims, 3 Drawing Sheets

U.S. PATENT DOCUMENTS

| | | | |
|---|---|---|---|
| 6,210,802 B1 | 4/2001 | Risch et al. | |
| 6,215,931 B1 | 4/2001 | Risch et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |
| 6,493,491 B1 | 12/2002 | Shen et al. | |
| 6,597,496 B1 * | 7/2003 | Nayfeh et al. | 359/343 |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,749,446 B2 | 6/2004 | Nechitailo | |
| 6,869,544 B2 | 3/2005 | Chen et al. | |
| 6,876,796 B2 * | 4/2005 | Garito et al. | 385/50 |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 6,978,070 B1 * | 12/2005 | McCarthy et al. | 385/123 |
| 7,045,010 B2 | 5/2006 | Sturman, Jr. | |
| 7,162,128 B2 | 1/2007 | Lovie et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,483,613 B2 | 1/2009 | Bigot-Astruc et al. | |
| 7,515,795 B2 | 4/2009 | Overton et al. | |
| 7,526,167 B1 * | 4/2009 | Minelly | 385/126 |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,724,998 B2 | 5/2010 | Parris et al. | |
| 7,817,891 B2 | 10/2010 | Lavenne et al. | |
| 7,817,896 B2 * | 10/2010 | Borrelli et al. | 385/142 |
| 7,843,026 B2 * | 11/2010 | Wang et al. | 257/432 |
| 2003/0087742 A1 | 5/2003 | Taylor et al. | |
| 2003/0111644 A1 | 6/2003 | Chen et al. | |
| 2003/0175003 A1 * | 9/2003 | Gasca et al. | 385/142 |
| 2003/0175004 A1 * | 9/2003 | Garito et al. | 385/143 |
| 2003/0234978 A1 * | 12/2003 | Garito et al. | 359/341.5 |
| 2004/0174917 A1 * | 9/2004 | Riman et al. | 372/43 |
| 2005/0213624 A1 | 9/2005 | Taylor et al. | |
| 2007/0108413 A1 | 5/2007 | Chi et al. | |
| 2007/0274664 A1 * | 11/2007 | van Veggel et al. | 385/142 |
| 2008/0292262 A1 | 11/2008 | Overton et al. | |
| 2009/0116798 A1 * | 5/2009 | Blanchandin et al. | 385/123 |
| 2009/0175583 A1 | 7/2009 | Overton | |
| 2009/0207486 A1 * | 8/2009 | Burov et al. | 359/341.5 |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0142969 A1 | 6/2010 | Gholami et al. | |

FOREIGN PATENT DOCUMENTS

| | | |
|---|---|---|
| EP | 1921478 A1 | 5/2008 |
| EP | 2187486 A1 | 5/2010 |
| FR | 2889876 A1 | 2/2007 |
| WO | 2007/020362 A2 | 2/2007 |
| WO | 2009/062131 A1 | 5/2009 |

OTHER PUBLICATIONS

U.S. Appl. No. 60/986,737, "Microbend-Resistant Optical Fiber," filed Nov. 9, 2007.

U.S. Appl. No. 61/041,484, "Microbend-Resistant Optical Fiber," filed Apr. 1, 2008.

U.S. Appl. No. 61/112,595, "Microbend-Resistant Optical Fiber," filed Nov. 7, 2008.

Response to European Office Action in counterpart European Application No. 08291059.7 dated Feb. 25, 2011, pp. 1-8.

European Office Action in counterpart European Application No. 08291059.7 dated Jan. 24, 2012, pp. 1-6.

Patra, Study of photoluminesecence properties of Er3 + ions in SiO2-GeO2 and Al2)3 nanoparticles, Solid State Communications 132, pp. 299-303 (2004) [cited in European Search Report].

Podrazky et al., Use of alumina nanoparticles for preparation or erbium-doped fibers, Institute of Photonics and Electronics AS CR, v.v.i., Chaberska 57, Prague, Czech Republic, pp. 246-247 (2007) [cited in European Search Report].

Wang et al., Novel erbium doped fiber for high power applications in Passive Components and Fiber-based Devices, in Proceedings of the SPIE, vol. 5623, pp. 411-417 (2005).

Tammela et al., Potential of nanoparticle technologies for next generation erbium-doped fibers OFC'04,. OFC2004 Technical digest, FB5, 2004.

European Search Report in counterpart European Application No. 08291059, dated Jul. 10, 2009.

Partial European Search Report in counterpart European Application No. 08291059, dated May 26, 2009.

* cited by examiner

AMPLIFYING OPTICAL FIBER AND METHOD OF MANUFACTURING

CROSS-REFERENCE TO PRIORITY APPLICATIONS

This application claims the benefit of pending European Application No. 08291059.7 for an "Amplifying Optical Fiber and Method of Manufacturing" (filed Nov. 12, 2008, at the European Patent Office), which is hereby incorporated by reference in its entirety.

This application further claims the benefit of U.S. Patent Application No. 61/119,963 for an "Amplifying Optical Fiber and Method of Manufacturing" (filed Dec. 4, 2008), which is hereby incorporated by reference in its entirety.

FIELD OF INVENTION

The present invention relates to amplifying optical fibers, which, for example, can be used in optical amplifiers.

BACKGROUND OF THE INVENTION

Commonly assigned U.S. Patent Publication No. 2003/0175003, which is hereby incorporated by reference in its entirety, relates to amplifying optical fibers having nanoparticles in the matrix of the central core. This publication is related to the improvement of the accessible gain shape of optical amplifiers by means of the presence of nanoparticles in the matrix, wherein each kind of nanoparticle includes a specific rare earth element/matrix combination.

U.S. Patent Publication No. 2003/0087742, which is hereby incorporated by reference in its entirety, is related to a ceramic gain medium having crystalline nanoparticle clusters embedded in an amorphous matrix.

The present invention is related to improving the efficiency of the amplification by the optical fiber within a specified gain shape (e.g., by lowering the required pump power consumption).

An optical amplifier is a device that directly amplifies an optical signal without the need to first convert the optical signal to an electrical signal. Amplifying optical fibers and, notably, so-called doped fiber amplifiers (DFAs) use a doped optical fiber as a gain medium to amplify an optical signal. The optical signal to be amplified and a pump laser are multiplexed into the doped optical fiber, and the signal is amplified through interaction with the doping ions. These DFAs are involved in numerous optical applications.

Doping optical fibers with the rare earth element erbium (Er) can create so-called Erbium Doped Fiber Amplifiers (EDFAs). These EDFAs are used in long and ultra long haul optical telecommunication networks at 1550 nanometers to amplify transmitted optical signals. These EDFAs can be efficiently pumped with a pump laser at a wavelength of 980 nanometers or 1480 nanometers, and exhibit gain in the 1550 nanometer region.

Gain is defined as output signal power divided by input signal power. Input signal power corresponds to the power of the optical signal at the entry of the amplifying optical fiber. Output signal power corresponds to the optical signal power at the exit of the amplifying fiber (i.e., the amplified signal). The output signal power is the sum of input signal power and the pump energy which is transformed into signal power. The pump energy equals the pump power multiplied by the pump efficiency. Gain is thus a measure of the ability of the amplifier to increase the power of an optical signal.

Ytterbium (Yb) doping is often used in optical fibers for EDFAs to improve the erbium pump signal absorption efficiency via energy transfer between ytterbium and erbium. Moreover, ytterbium ions can be also used alone in high power laser applications.

Optical fibers for EDFAs typically include a central core composed of a silica-based matrix containing doping with erbium ions at an erbium ion concentration between 250 ppm (0.025 weight percent) and 1000 ppm (0.1 weight percent). The erbium ions are the source of optical gain. The gain results from the stimulated emission of electronic transitions to a lower energy state from a higher energy state previously populated by a pump source.

Optical fibers for EDFAs frequently include co-doping with other elements to improve the amplification. For example, improvements may include broadening and/or flattening the amplifying band or amplifying window (i.e., the range of optical wavelengths for which the amplifier yields a usable gain). One example is an optical fiber co-doped with erbium and aluminum, which allows amplification in the 1520-1570 nanometer wavelength division multiplex (WDM) C-Band. Other applications and other band positions can be reached by selecting a particular rare earth element and/or combinations thereof.

Optical amplification in a rare earth doped optical fiber is obtained by introducing a pump signal into the optical fiber, which then excites rare earth ions (e.g., $Er^{3+}$ ions in EDFAs). When an optical signal passes through this part of the optical fiber, a photon similar to the incident photon can be emitted when ions in an excited state return to the ground state. The incident optical signal will then be doubled and the rare earth ion is ready for another cycle of excitation and deexcitation. This process is called stimulated emission. If a rare earth doped optical fiber is combined with a resonant cavity composed of two mirrors or Bragg gratings, a laser optical fiber is obtained. The wavelength and power of the laser optical fiber depends on the nature and amount of the rare earth element used as a dopant.

There is a continuously increasing demand for WDM systems that will give rise to increasing markets for better and faster systems. Such new generation systems will need to include more efficient amplifiers and lasers, which are compatible with high power applications.

One focus in the development of more efficient optical fiber amplifiers is overcoming gain limitation or saturation. Output signal power is limited due to a finite number of rare earth ions and pump power. When the input power is low, one can have a high gain because the rare earth ions and the pump power are not saturated. If input power increases, one can increase the output power by concurrently increasing the pump power, so that the gain level can be maintained. When the limit of pump power and rare earth concentration is reached, the output power reaches its limit, and the gain cannot be maintained. If the input signal power increases above the pump power limit, the gain decreases (i.e., the saturation of the gain has been reached). This explains why at low input signal power, one can have an increase in output power and high gain. It also explains why at high input signal power, output signal power is maximal and the gain decreases to reach a minimum. The gain limitation is imposed by the pumping schemes that are presently used. The power of present pumping schemes is limited to commercially available 750 mW laser pumps. Moreover, for cost and technical reasons, such as heat dissipation and power consumption, present pumping schemes are often limited to a combination of only two pumps, which limits the total pump power to 1.5 W (i.e., 2×750 mW). This dual pump scheme imposes a limit on the amplifier gain and output power, which are presently incompatible with the requirements for new generation amplifiers. The problem of gain saturation becomes increasingly important as the input signal power increases.

Accordingly, obtaining higher output power or producing a given output power with lower pump energy is desired. This can be accomplished by increasing the efficiency of the amplifying medium (i.e., the rare earth doped fiber), which corresponds with the technical problem to be solved of the present invention.

A second key point in the development of more efficient amplifiers is decreasing the costs of the several components for a given output power and a given amplifying band or window. This can be achieved by reducing the required pump power because the energy consumption of the pump in an amplifier represents a major part of the utilization budget and consequently, significant pump power reductions will result in a desirable cost reduction.

The publication of B. S. Wang et al. "*Novel erbium doped fiber for high power applications in Passive Components and Fiber-based Devices*", in Proceedings of the SPIE, volume 5623, pp. 411-417 (2005), which is hereby incorporated by reference in its entirety, reports that high power applications require optimization of both the design of the optical fiber waveguide and the design of the doping composition. This publication discloses that adjusting the optogeometrical parameters of the optical fiber can improve pump power conversion efficiency (PCE) by optimizing the overlap between pump mode field and the erbium ions. Adjusting the optogeometrical parameters by decreasing the numerical aperture and by increasing the cut-off wavelength of the optical fiber does not have a detectable effect on the bending losses of the optical fiber. Additionally, this publication discloses that increasing the erbium ion concentration and the erbium ion homogeneity along the fiber length improves the doping of the fiber. The latter improvement can be achieved by using a high aluminum ion concentration in the core of the optical fiber, while simultaneously ensuring certain spectral shape characteristics and limiting the clustering of the erbium ions.

However, the solution disclosed in this publication is not sufficient for pump powers exceeding 350 mW. Moreover, the high aluminum ion concentration is not very compatible with the desired low numerical aperture, because aluminum ions are known to significantly increase the refractive index of the optical fiber core. Finally, high aluminum ion concentration induces an increase in the background losses of the optical fiber, which can dramatically impact the efficiency of the gain medium.

The publication of S. Tammela et al., "*Potential of nanoparticle technologies for next generation erbium-doped fibers*" OFC'04, OFC2004 Technical digest, FB5 (2004), which is hereby incorporated by reference in its entirety, discloses a method of increasing gain medium efficiency by incorporating high rare earth ion doping and a more homogeneous dispersion of rare earth ions within the optical fiber core. This is achieved using an optical fiber manufacturing method involving a so-called Direct Nanoparticle Deposition (DND) process. This DND-process is an alternative technical solution to the known Modified Chemical Vapor Deposition (MCVD) process frequently used to dope optical fiber cores. This publication discloses the use of a manufacturing process based on an Outside Vapor Deposition (OVD) technique by which the silica-based matrix and the doping are simultaneously realized. Nanoparticles composed of rare earth doped silica powder, possibly co-doped with other elements, are formed when element precursor reactants are simultaneously introduced into the flame of a specially designed torch. The nanoparticles that are produced are then directly projected and vitrified or sintered on a rotating rod to provide the doped silica layers that will constitute the core of the optical fiber. This publication discloses that the DND-process provides a homogeneous dispersion of rare earth ions within the core of the optical fiber at high rare earth ion concentration due to fusion of the nanoparticles with the silica material during vitrification of both.

Such a manufacturing process, however, does not preserve the structure of the nanoparticles within the central core of the amplifying optical fiber. The nanoparticles are doped silica particles, such as those obtained by a vapor phase deposition process, and sintered at high temperature to form the glass layers that will give rise to the primary optical preform. Accordingly, there are no nanoparticles present in the resulting optical fiber because the matrix of the nanoparticles has fused with the matrix of the central core during the manufacturing of the optical fiber. Consequently, the close chemical environment of the doping ions of the rare earth element, which governs the main gain characteristics through fluorescence properties of the doping ions, cannot be finely controlled using this technique. This manufacturing process, therefore, limits the adjustability of the optogeometrical parameters independently from doping characteristics. Increase in the efficiency of the gain medium for a specified gain shape will consequently be limited.

Inserting rare earth dopants within a fiber core by incorporating nanoparticles doped with rare earth elements can be achieved using a modified chemical vapor deposition (MCVD) process. European Patent No. 1,917,702 and International Publication No. 2007/020362 (and their counterpart U.S. Patent Publication No. 2009/0116798), which are hereby incorporated by reference in their entirety, disclose optical fibers containing nanoparticles in the central core of the amplifying optical fiber. The nanoparticles disclosed in these documents contain doping ions of a rare earth element and doping ions of at least one element for improving the signal amplification (e.g., aluminum, lanthanum, antimony and/or bismuth). However, due to the design, chemical composition, size and/or concentration of these nanoparticles, the characteristics of the process for including the doping ions in the central core or the optogeometrical characteristics do not guarantee the maximization of the gain medium efficiency at high pump power regime.

Commonly assigned U.S. Patent Publication No. 2003/0175003 discloses a method of preparing nanoparticles using either a laser ablation process or a modified sol-gel process. These processes, however, cannot produce nanoparticles having doping ion distances appropriate for use in the amplifying optical fiber of the present invention.

U.S. Pat. No. 6,869,544 (and its corresponding U.S. Patent Publication No. 2003/0111644), each of which is hereby incorporated by reference in its entirety, discloses a process based on gel formation using a precipitation agent (e.g., an organic acid) that forms a complex with the active species.

There remains a need for an amplifying optical fiber doped with rare earth elements that allows for increasing the gain medium efficiency in a specified gain configuration.

SUMMARY OF THE INVENTION

Accordingly, in one aspect, the present invention embraces an amplifying optical fiber having a central core and an optical cladding surrounding the central core. Amplifying optical fibers, for example, can be used in optical amplifiers for high bit-rate optical transmission links.

In one embodiment, the amplifying optical fiber's central core includes a silica matrix containing nanoparticles. The nanoparticles, which are typically distinct from the surrounding silica matrix, are composed of a matrix material that includes doping ions of at least one rare earth element.

The concentration of the doping ions is typically between about 0.01 weight percent and about 1 weight percent of the total weight of the central core. More typically, the concentration of the doping ions is between about 0.01 weight percent to 0.5 weight percent (e.g., between 0.01 weight percent and 0.2 weight percent). The average distance between the doping ions is typically at least 0.4 nanometers.

In another aspect, the present invention embraces an optical amplifier and an optical laser that includes the present amplifying optical fiber.

In yet another aspect, the present invention embraces a method for preparing a suspension of nanoparticles that are composed of a matrix material that includes doping ions of at least one rare earth element.

In yet another aspect, the present invention embraces a method for manufacturing an amplifying optical fiber.

In yet another aspect, the present invention embraces the use of an amplifying optical fiber.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention improves the intrinsic efficiency of the process by which each rare earth ion absorbs the pump signal, transfers the electrons to the excited state, and emits a photon similar to the incident optical signal while falling back into the ground state level.

In another aspect of the present invention, the optogeometrical parameters of the central core of the optical fiber, as well as its doping characteristics, are adapted to increase the overall gain per unit fiber length. Improving efficiency can be achieved by increasing the gain and decreasing the pump power consumption for a given gain value. However, this improvement method is limited by the interdependence of several of the parameters (e.g., rare earth ion concentration, rare earth ion dispersion and rare earth ion close chemical environment). Consequently, even if the key parameters that influence the efficiency are known, it is not possible to achieve the most beneficial effect of each one of the parameters because they are interdependent.

Incorporating doping ions of rare earth element(s) in the matrix material of nanoparticles, wherein the solubility and dispersion of the doping ions in the matrix material of the nanoparticles is closely controlled gives rise to the required properties.

As noted, the present amplifying optical fibers may include distinct nanoparticles that can be distinguished from the surrounding silica matrix of the optical fiber's central core.

Without being bound by any particular theory, it is believed that the concentration of rare earth doping ions yields improved results because (i) such a concentration produces a good gain and (ii) the dispersion of rare earth doping ions within the nanoparticles is such that the minimal distance between rare earth ions is greater than the minimal distance at which two rare earth doping ions can be assimilated as a pair or a cluster. Assimilation leads to a concentration quenching phenomenon and a resulting decrease in amplification efficiency.

Typically, the distance between two rare earth ions should be at least 0.4 nanometer (i.e., a minimal separation of four atoms). In an exemplary embodiment, the distance between the two rare earth ions is at least 0.6 nanometer (i.e., a minimal separation of six atoms). More typically, the distance between the two rare earth ions is at least 0.8 nanometer (i.e., a minimal separation of eight atoms).

In general, the phrase "average distance" refers to the average separation between each doping ion and its nearest adjacent doping ion (i.e., the average of the distances of each set of two doping ions). In this regard, the phrase "average distance" is a useful way to characterize the separation between sets of neighboring doping ions within the nanoparticle's matrix material.

Typically, the average distance between doping ions and their neighboring doping ions should be at least 0.4 nanometer. Even though the majority of the distances between the rare earth doping ions should be 0.4 nanometer or more, it is possible that there are several doping ions present in a nanoparticle that are closer than 0.4 nanometer.

By way of illustration, within a nanoparticle's matrix material, the separation between a doping ion and its nearest adjacent doping ion (i.e., the "doping-ion separation") is at least 0.4 nanometer for a majority of the doping ions, typically for at least about 80 percent of the doping ions, more typically for at least about 90 percent of the doping ions. It is desirable for each doping ion within a nanoparticle to be separated from its nearest adjacent doping ion by at least 0.4 nanometer (i.e., each set of doping ions is separated by at least 0.4 nanometer).

The concentration of the doping ions in the central core of the present amplifying optical fiber is at least 0.01 weight percent. Typically, the concentration of the doping ions is between about 0.1 weight percent and about 1 weight percent. More typically, the concentration of the doping ions is less than about 0.2 weight percent.

The doping ions of the rare earth element are located in the nanoparticles and not in the matrix of the central core of the optical fiber. In this regard, the doping ion concentration in the central core can be adapted by increasing the number of nanoparticles within the central core, increasing the doping ion concentration within each of the nanoparticles, or increasing the size of the nanoparticles and/or a combination thereof, depending on the application.

It is of course within the scope of the present invention to use several types of nanoparticles each having independently chosen doping ion concentration, matrix constitution and size.

Typically, the doping ion concentration in the nanoparticles is between about 0.1 weight percent and about 20 weight percent (e.g., between about 0.5 weight percent and about 15 weight percent). In this regard, the doping ion concentration in the nanoparticles may be selected to control the concentration of doping ions in the central core of the amplifying optical fiber according to the present invention.

The doping ion concentration and doping ion distance (i.e., dispersion) can be obtained using certain matrixes (e.g., matrixes having particular levels of aluminum, phosphorus, or calcium). The matrix of the nanoparticles is selected in such a manner as to ensure certain gain characteristics for the rare earth doping ions. The desired gain characteristics depend on the amplifying gain shape of a particular application.

For example, WDM applications typically require a wide amplifying band, while single channel amplification or laser applications typically require an intense, sharp band. The gain shape characteristics of a rare earth doping ion are governed by the ion's close chemical environment within the central core of the optical fiber. In this regard, controlling neighbor elements of the rare earth doping ions facilitates achieving the appropriate gain shape. Some elements widen the gain band associated with a specific rare earth, such as fluoride, aluminum, zirconium, and tellurium. Other elements give rise to a narrow band, such as sodium or phosphorus, while keeping high rare earth solubility property.

Additionally, the structure of the rare earth ion's close chemical environment will have a strong influence on band width. For example, amorphous disordered structures will favor band widening, while crystalline phases or weakly disordered amorphous structures will favor sharp intense bands. Incorporating rare earth doping ions into an optical fiber using specific nanoparticles facilitates better tailoring of rare earth environment compared to a random doping process.

The matrix of the nanoparticles may be selected to obtain desired characteristics. Using the present method for preparing nanoparticles enables the construction of nanoparticles having a matrix selected for a particular application because the nanoparticles may be synthesized before being incorporated into the optical fiber's central core.

In addition, the matrix of the nanoparticles is typically selected in such a manner as to have a phonon energy favoring rare earth deexcitation by stimulated emission.

Figure 1A:
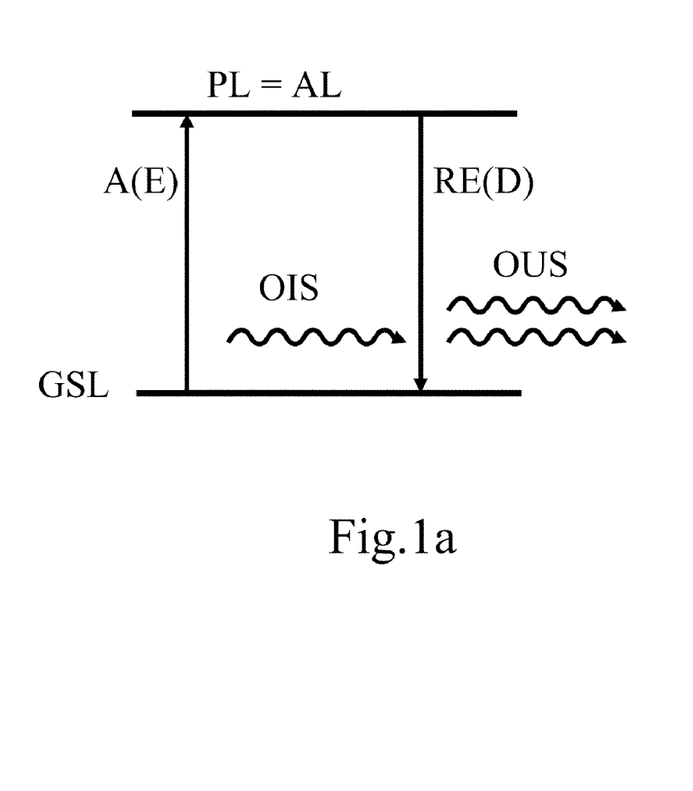
FIG. 1a schematically depicts a two-level excitation scheme for pumping with a 1480-nanometer laser.

FIG. 1a schematically depicts an amplification scheme for an erbium doped amplifying optical fiber using a 1480-nanometer pump laser. The lower horizontal line depicts the ground state energy level (GSL) of the erbium electrons. Upon pumping with the pump laser, electrons are excited by means of laser energy absorption and move to a higher energy level following the left arrow of absorption (excitation), or A(E). The electrons are transferred to the pump level (PL) which is the same as the amplifying level (AL). Upon entry of an optical signal into the optical fiber, which is depicted by the single wave-line arrow on the left (optical input signal or OIS), the electrons in the amplifying level fall back to the ground state level while radiation emission or deexcitation (RE (D)) takes place following the right arrow. During this phase the optical signal is doubled as visible by the two wave-line arrows on the right (optical output signal or OUS).

In one embodiment of the present invention, related to a two-level amplifying scheme as depicted in FIG. 1a, the matrix material of the nanoparticles has a phonon energy that is less than about 20 percent of the energy gap between the amplifying level and ground state level of the rare earth element during pumping. Typically, the phonon energy is less than about 15 percent of the energy gap between the amplifying level and ground state level. To improve efficiency of the deexcitation of the doping ions, the matrix of the nanoparticles should have a phonon energy that is limited or restricted to a certain window. Outside this window, the efficiency will be decreased because energy will be transferred from the amplifying level to the matrix network. Excited electrons will be lost for signal amplification, and therefore, the efficiency will be decreased.

Figure 1B:
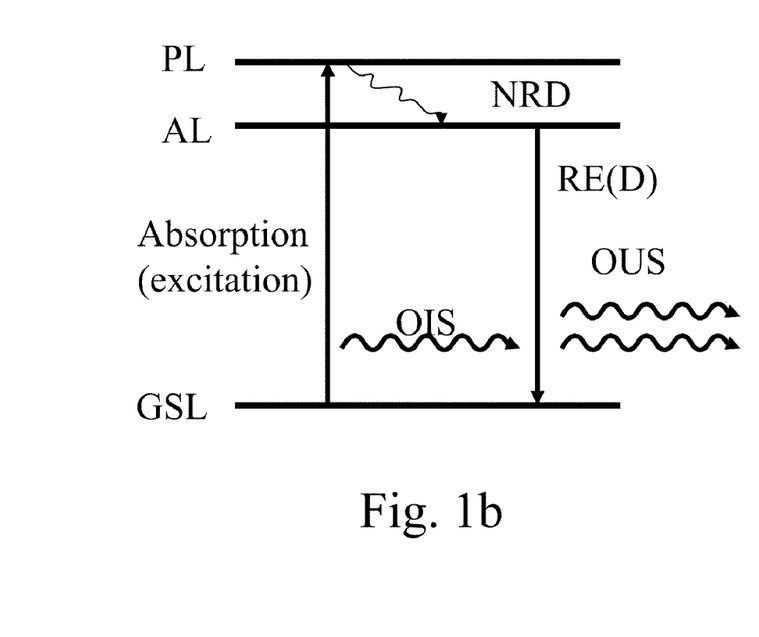
FIG. 1b schematically depicts a three-level excitation scheme for pumping with a 980-nanometer laser.

FIG. 1b schematically depicts an amplification scheme for an erbium doped amplifying optical fiber using a 980-nanometer pump laser. This scheme is slightly more complex and has an additional, third energy level. The lower horizontal line depicts the ground state energy level (GSL) of the erbium electrons. Upon pumping with the laser, electrons are excited by means of laser energy absorption and move to a higher energy level following the left arrow of absorption (excitation), or A(E). The electrons are transferred to the pump level (PL) which is higher than the amplifying level (AL). An additional step of non-radiative deexcitation (NRD) takes place wherein the energy difference between the pump level and the amplifying level is absorbed by the matrix material of the nanoparticle and the electron is transferred from the pump level to the amplifying level. Upon entry of an optical signal into the optical fiber, which is depicted by the single wave-line arrow on the left (optical input signal or OIS), the electrons in the amplifying level fall back to the ground state level while radiation emission or deexcitation (RE (D)) takes place following the right arrow. During this phase the optical signal is doubled as visible by the two wave-line arrows on the right (optical output signal or OUS).

In another embodiment of the present invention, related to a three-level amplifying scheme as depicted in FIG. 1b, the matrix material of the nanoparticles has a phonon energy of at least about 25 percent of the energy gap between the pump level and the amplifying level of the rare earth element during pumping. Additionally, the matrix material of the nanoparticles has a phonon energy of less than about 22 percent of the energy gap between the amplifying level and ground state level of the rare earth element during pumping (e.g., less than about 18.5 percent). In this embodiment there is a minimum level of phonon energy required for the matrix material of the nanoparticles. Because the pump level and the amplifying level are not the same, a particular amount of energy is transferred to the matrix material such that the electron may transfer from the pump level to the amplifying level. This electron transfer facilitates deexcitation and signal amplification because electrons falling from the amplifying level to the ground state level emit radiation which amplifies the signal.

It is desirable to limit the probability of other radiative and non-radiative fluorescence extinction processes while the processes of FIGS. 1a and 1b are occurring. Typically, other radiative and non-radiative fluorescence extinction processes significantly interfere with the amplification of the optical signal. A non-exhaustive list of examples of these processes includes multiphonon relaxation, transfer to defects or impurities in the matrix material, ion-ion transfer (so-called cross-relaxation), ETU for Energy Transfer Up-conversion, and excited state absorption. In an amplifying optical fiber, the measured undesirable fluorescence decay from the amplifying level is determined as the sum of different phenomenon probabilities.

The measured fluorescence decay may be determined according to the following formula:

$$W_{meas} = W_{rad} + W_{MP} + W_{CR} + W_{ET}, \text{ wherein}$$

$W_{meas}$ is the measured fluorescence decay,
$W_{rad}$ is the probability of radiative deexcitation, $W_{MP}$ is the probability of multiphonon relaxation,
$W_{CR}$ is the probability of cross-relaxation, and
$W_{ET}$ is the probability of energy transfer to neighboring impurities and defects.

In this regard, radiative deexcitation, multiphonon relaxation, cross-relaxation, and energy transfer to neighboring impurities and defects are exemplary non-radiative deexcitation processes.

A decrease of the amplifying process efficiency is typically caused by these types of non-radiative phenomena. These phenomena depend upon the vibration energy of the matrix of the nanoparticles, which is quantified as the energy quantum or phonon. The higher the matrix phonon energy is, the higher the probability for these processes to occur. In the context of amplification, it is, therefore, desirable to find an appropriate matrix phonon energy level. In this view, one can define a window in which matrix phonon energy should be restricted in order to improve amplification.

For example, if we consider erbium amplification with 980-nanometer pumping, the energy gap between the rare earth pump level and amplifying level is around 4000 cm$^{-1}$, and the energy gap between the rare earth amplifying level and ground state level is around 6500 cm$^{-1}$. In this exemplary embodiment, the NP matrix phonon energy should be between about 1000 and 1400 cm$^{-1}$ (e.g., between about 1000 and 1200 cm$^{-1}$). Silicate, phosphate, aluminate, or multicomponent matrixes including silicon oxides, phosphorous oxides, and aluminum oxides in thermodynamically stable composition possess phonon energy levels within this range.

Moreover, deexcitation processes involving energy transfer between excited rare earth ions and defects or impurities (e.g., OH) of the nanoparticles may be avoided or strictly limited by the manufacturing process of the nanoparticles and the process of incorporating the nanoparticles within the central core of the optical fiber.

Figure 2A:
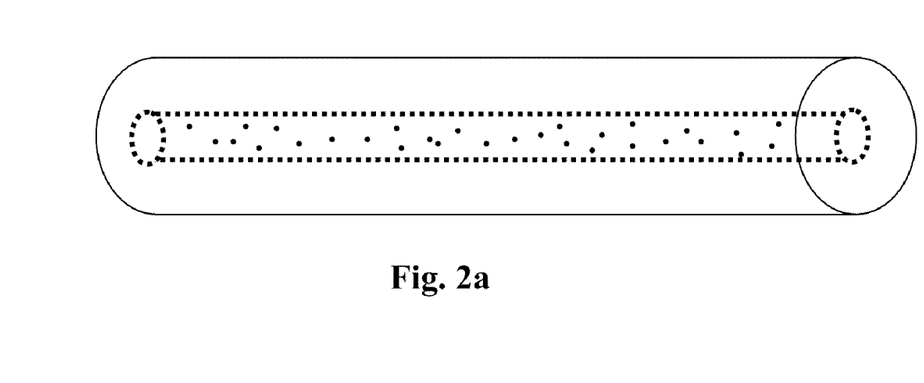
FIG. 2a schematically depicts a side view of an optical fiber according to one exemplary embodiment of the present invention.

FIG. 2a schematically depicts a side view of an exemplary optical fiber according to one embodiment of the present invention. The central core is depicted by a broken line, and the black dots represent nanoparticles that include rare earth ions. The central core is surrounded by the optical cladding.

Figure 2B:
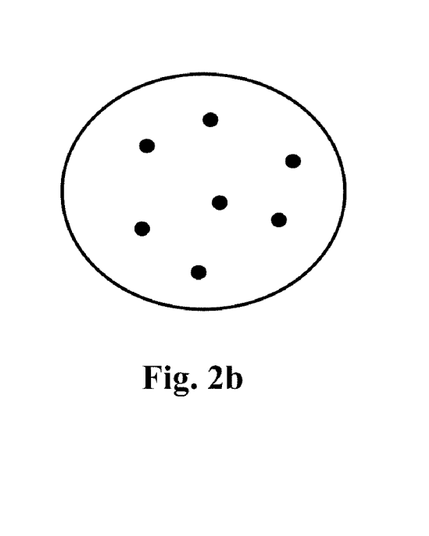
FIG. 2b schematically depicts a cross-section of a single nanoparticle including ions of a rare earth element.

FIG. 2b schematically depicts a cross-section of a single nanoparticle that includes ions of a rare earth element. In this regard, the black dots depict separate rare earth ions embedded in the nanoparticle's matrix material.

As previously explained, the nanostructure of the nanoparticles should be preserved during the incorporation of the nanoparticles into the amplifying optical fiber. In this regard, the structure of the nanoparticle should resist the high temperatures used during the collapsing and fiber drawing processes. For example, the nanoparticle should be able to withstand temperatures higher than 1800° C. or even 2000° C. Matrix materials for the nanoparticles may be selected to achieve proper temperature resistance. In this regard, nanoparticles should have a matrix material that is resistant (i.e., does not melt or evaporate) to temperatures of at least 1800° C., typically at least 2000° C. For example, the nanoparticle matrix material may be alumina; however, other materials having similar resistance to high temperature may be used.

Other nanoparticle designs may be used, such as a core shell structure in which a nanoparticle includes a core made of a core matrix material, which is surrounded by a shell made of a heat resistant matrix material. This dual structure facilitates the creation of highly resistant nanoparticles independent of the core matrix material of the nanoparticles. In this regard, the nanoparticles' core matrix material can be chosen to fit the appropriate amplifying characteristics, even if the chosen core matrix material is not able to resist to high temperatures. In this dual structure embodiment, the nanoparticles' resistance to high temperature is attributable to the nanoparticles' shell material.

In an exemplary embodiment, the matrix material of the nanoparticles is alumina ($Al_2O_3$), phosphorus oxide ($P_2O_5$), or a combination of alumina and phosphorus oxide.

In an exemplary embodiment, the matrix material of the nanoparticles is amorphous. In order to improve the fiber optical core transparency, the nanoparticles in the central core should cause relative low levels of light scattering. If the nanoparticles have a different refractive index from the central core, light scattering will occur. In this regard, the structure of the nanoparticle should typically be amorphous because crystalline nanoparticles scatter more light. If crystalline nanoparticles are utilized, the nanoparticles' refractive index and the doping ion concentration should be considered when selecting the nanoparticles' size.

The rare earth content within the central core of the optical fiber can be linked to the attenuation of rare earth ions at absorption peak expressed in dB/m. This peak should be between about 2 and 20 dB/m.

In an embodiment of the present invention, the silica-based matrix of the central core is doped with germanium, phosphorus, fluoride, boron and/or one or more combinations thereof. These doping elements can be used to increase or decrease the refractive index of the central core.

In an exemplary embodiment of the present invention, the total concentration of alumina in the central core is less than or equal to 4 weight percent of the central core (e.g., less than 3.5 weight percent). The concentration of alumina in the nanoparticles is controlled because high levels of alumina can create a high refractive index difference with the outer cladding. As the concentration of alumina increases, light scattering increases, which, as previously discussed, is undesirable.

In an exemplary embodiment, the rare earth element is erbium, ytterbium, thulium, and/or a combination of these elements (e.g., erbium or a combination of erbium and ytterbium).

In some embodiments, additional elements are present in the matrix of the nanoparticles to improve several matrix properties (e.g., the solubility of the rare earth doping ions). In this regard, additional elements may include calcium, aluminum, sodium and/or phosphorus. By way of example, including alumina in the nanoparticle's matrix material tends to promote good solubility of the rare earth doping ions.

As previously discussed, the number of rare earth ions per nanoparticle can be controlled. Consequently, for a particular nanoparticle size, the final rare earth concentration within the central core of the optical fiber will be driven by the concentration of the nanoparticles in the fiber core (i.e., the number of nanoparticles incorporated during the doping step). The total rare earth concentration within the central core of the optical fiber can be selected for a particular application and can be achieved by adjusting either the concentration of nanoparticles in the central core ($[NP]_{core}$) or the rare earth doping ion concentration in each of the nanoparticles ($[RE]_{NP}$). The selected total rare earth concentration in the core is given by the product $[NP]_{core} \times [RE]_{NP}$.

For example, when using a high input signal power, the relationship between $[NP]_{core}$ and $[RE]_{NP}$ may be adjusted to ensure 100 percent rare earth inversion and minimum pump power consumption to achieve a given output power signal. In this regard, one could reach the desired rare earth concentration within the central core of the optical fiber by selecting either a high $[NP]_{core}$ and low $[RE]_{NP}$, or a low $[NP]_{core}$ and high $[RE]_{NP}$.

Typically, the optical fiber has background attenuation losses less than or equal to 4 dB/km at 1200 nanometers (e.g., less than about 2 dB/km at 1200 nanometers).

The size of the nanoparticles is typically less than or equal to about 100 nanometers. More typically, the size of the nanoparticles is less than about 50 nanometers (e.g., less than 20 nanometers). If the refractive index of the nanoparticles is close to the refractive index of the central core, the size of the nanoparticles may be as high as several tens of nanometers because less light scattering will occur. If, however, the refractive indexes of the nanoparticles and the central core are significantly different, the size of the nanoparticles should be less than about 20 nanometers to reduce light scattering.

The size of the nanoparticles is typically at least about 2 nanometers, more typically at least about 5 nanometers.

In embodiments of the present invention, the optical guidance structure may be adjusted independently of the gain performance, because the matrix of the nanoparticles (responsible for gain performance) can be adapted independently from the matrix of the central core (responsible for optical guidance structure). Therefore, it is possible to adapt the optogeometrical parameters to increase amplifier efficiency (e.g., by selecting a certain cut-off wavelength and refractive index of the central core) without affecting the optical response of rare earth doping ions.

The transparency of the central core of the optical fiber in the application wavelength window influences the overall gain that can be achieved by the amplifying medium. To obtain such transparency, the attenuation threshold of the optical fibers should be as low as possible. In conventional doping processes that do not use nanoparticles, the optical performance and the central core matrix composition are interdependent. This interdependence makes it difficult to adapt the central core optical transparency independently from the rare earth close chemical environment. For example, WDM doped fibers for EDFAs typically include relatively high aluminum concentrations to ensure sufficient aluminum atoms in the erbium environment. However, this results in poor transparency in the central core and a decrease in efficiency.

An optical fiber is conventionally composed of (i) an optical core, which transmits (and optionally amplifies) an optical signal, and (ii) an optical cladding, which confines the optical signal in the core. In this regard, the refractive indexes of the core ($n_c$) and of the cladding ($n_g$) are such that $n_c > n_g$ (i.e., the refractive index of the core is greater than that of the cladding). The propagation of an optical signal in a single-mode optical fiber is broken down into a fundamental mode (known as $LP_{01}$) guided in the core, and secondary modes guided over a certain radius in the core-cladding assembly.

For optical fibers, the refractive index profile is generally depicted in graphs wherein the refractive index of the optical fiber is plotted as a function of the distance from the center of the optical fiber along the radius. The external cladding functions as an optical cladding and typically has a substantially constant refractive index. The optical cladding is typically composed of pure silica but may also contain one or more dopants. The optical fiber refractive index profile is referred to as a "step" profile, a "trapezoidal" profile, or a "triangular" profile when the graphs of the refractive index profiles exhibit the shapes of a step, a trapezoid, or a triangle, respectively. These curves represent the theoretical or reference index profile (i.e., set profile) of the fiber. Fiber manufacturing constraints may lead to slightly different profiles in the actual fiber. In some embodiments according to the present invention, the amplifying optical fiber has a "step" refractive index profile.

In one embodiment, the amplifying optical fiber includes a central core and an external optical cladding, wherein the central core possesses a radius, r, and a refractive index difference, $\Delta$, relative to the external optical cladding. Typically, the radius of the central core is between 3 and 6 microns (µm). The refractive index difference of the central core is typically positive and between about $6 \times 10^{-3}$ and $20 \times 10^{-3}$.

To obtain improved pump confinement, an exemplary optical fiber typically has a mode field diameter (MFD) between about 4 and 7 µm at a wavelength of 1550 nanometers and a numerical aperture between 0.16 and 0.20 nanometer (e.g., between 0.17 to 0.19). To further improve pump confinement, the exemplary amplifying optical fiber typically has a cutoff wavelength ($\lambda_c$) less than 1300 nanometers (e.g., less than 1200 nanometers).

Typically, the pump confinement or pump conversion efficiency (PCE) of an amplifying optical fiber in accordance with the present invention is greater than 90 percent at a pumping wavelength of 980 nanometers.

In one embodiment, the amplifying optical fiber exhibits signal confinement at 1550 nanometers of at least 70 percent. As will be understood by one having ordinary skill in the art, signal confinement is the overlap between the erbium emission and the signal mode field.

Typically, an optical fiber of the present invention is designed while considering the following factors: (i) the efficiency of rare earth doping ions, which may be controlled by the chemical environment and concentration of the doping ions; (ii) the optogeometrical parameters of the optical fiber; and (iii) the transparency of the matrix of the central core of the optical fiber in the application wavelength window. The present invention also relates to the use of an amplifying optical fiber according to the present invention in an optical amplifier or an optical laser. Furthermore, the present invention relates to the use of an amplifying optical fiber according to the present invention to improve the efficiency of the fiber within a specified gain shape.

In addition, the present invention relates to an optical amplifier or an optical laser including at least a length of an amplifying optical fiber according to the present invention.

An exemplary optical amplifier including a part of a fiber according to the invention can be used in a high power regime to achieve a 23 dBm signal output power with a pump power of less than 550 mW, a 25 dBm signal output power with a pump power of less than 1000 mW, or a 27 dBm signal output power with a pump power of less than 1500 mW.

The present invention also embraces a method for preparing a suspension of nanoparticles that are composed of a matrix material having doping ions of at least one rare earth element. In this regard, an exemplary method of producing nanoparticles employs soft chemistry starting from inorganic salt precursors.

Figure 3A:
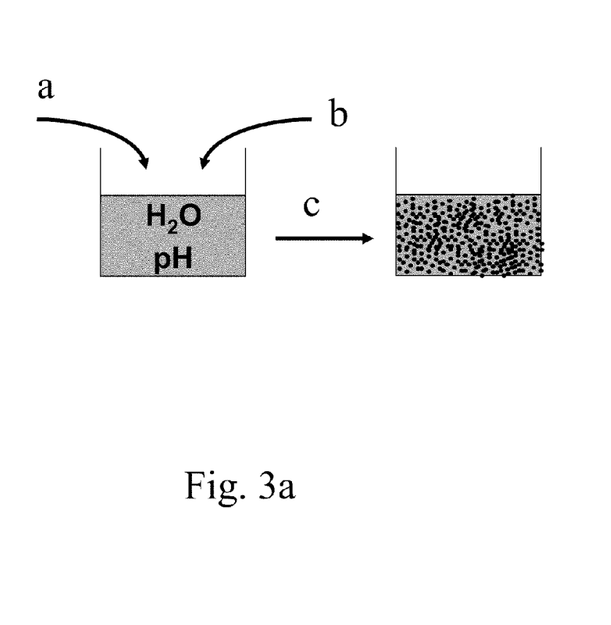
FIG. 3a depicts a method of preparing the nanoparticles according to the present invention.

In one embodiment depicted in FIG. 3a, the method according to the present invention includes the steps of:
 a) providing at least one compound having at least one ion of a rare earth element;
 b) providing at least one compound having at least one ion to form the matrix material of the nanoparticle; and
 c) adding the compounds obtained in step a) and step b) to an aqueous solution having a pH in the range of 3-12 (e.g., between 6 and 10) while stirring to obtain a suspension of nanoparticles.

The method according to the present invention involves the pH-controlled precipitation of nanoparticles, wherein the reactant does not form a complex with the active species and the reactant does not act as a ligand. Moreover, the reactant according to the present invention is typically an inorganic base (e.g., NaOH (sodium hydroxide) or KOH (potassium hydroxide)).

FIG. 3a graphically depicts an embodiment of this process. In step a) the rare earth salt is provided. In step b) the compound is provided which will give rise to the matrix of the nanoparticle. Typically, the ratio of the amount of compound a) to the amount of compound b) is 1:10 to 300.

In an exemplary embodiment of the present method for preparing a suspension of nanoparticles, the at least one compound in step a) is an erbium salt, such as erbium nitrate, erbium acetylacetonate, erbium chloride and/or combinations thereof.

In another exemplary embodiment of the present method for preparing a suspension of nanoparticles, the at least one compound in step b) is an aluminum salt, a phosphorus salt or a combination thereof. Typically, the compound is aluminum nitrate, phosphorus trichloride oxide, or a combination thereof.

In another exemplary embodiment of the present method for preparing a suspension of nanoparticles, step c) is carried out at a temperature between about 10 and 50° C. (e.g., between 20 and 40° C.).

In addition, the present invention relates to a method for manufacturing an amplifying optical fiber according to the present invention.

Commonly assigned U.S. Patent Publication No. 2003/0175003, which, as noted, is incorporated by reference in its entirety, discloses a method of manufacturing an amplifying optical fiber. The present invention, however, includes a method including a heating step to strengthen the structure of the nanoparticles before the hollow tube including the nanoparticles is sintered and collapsed.

Figure 3B:
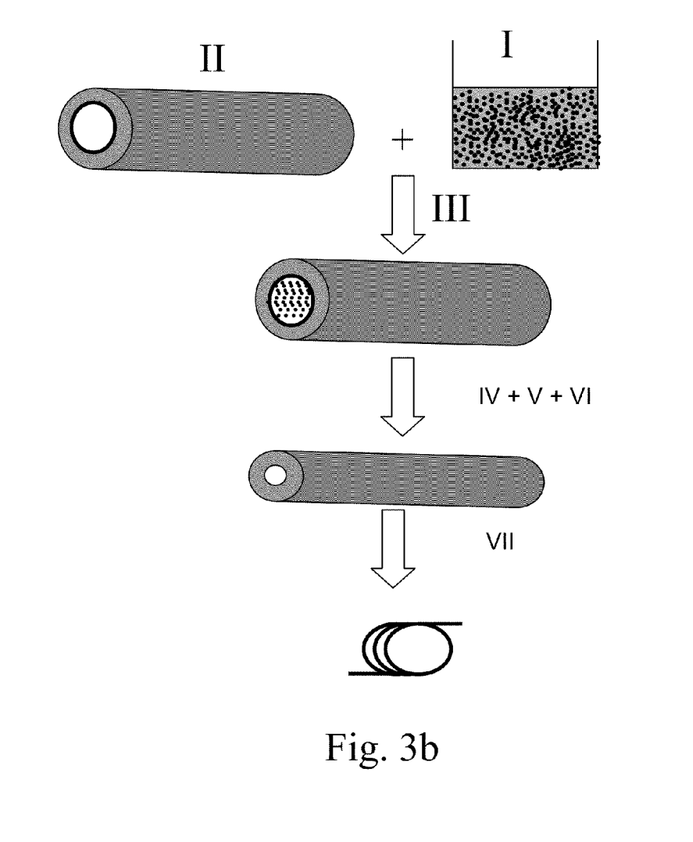
FIG. 3b depicts a flow diagram of a method of manufacturing an amplifying optical fiber according to an embodiment of the present invention.

The method according to the present invention includes the following steps, as depicted in FIG. 3b:

I) preparing a suspension of nanoparticles composed of a matrix material having doping ions of at least one rare earth element;
II) providing a hollow silica-based tube having an inner porous layer prepared by a chemical vapor deposition (CVD) process;
III) impregnating the inner porous layer of the hollow tube obtained in step II) with the suspension obtained in step I);
IV) applying heat to the doped inner porous layer obtained in step III) to eliminate residual water and strengthen the nanoparticles;
V) vitrifying and collapsing the hollow tube obtained in step IV) to obtain an optical preform;
VI) optionally sleeving or overcladding the optical preform obtained in step V) to obtain an optical preform having a modified ratio of central core diameter to optical cladding diameter; and
VII) drawing the optical preform obtained in step V) or step VI) to obtain an optical fiber having a central core and an optical cladding surrounding the central core, wherein the central core includes a silica matrix having nanoparticles, which nanoparticles are composed of a matrix material having doping ions of at least one rare earth element, wherein the concentration of the ions is between about 0.01 weight percent and about 1 weight percent of the total weight of the central core, typically between about 0.01 weight percent and about 0.2 weight percent, and wherein the average distance between the ions is at least 0.4 nanometers.

As previously discussed, the matrix of the nanoparticles within the fiber core should be resistant to the stress and temperature conditions of preform manufacturing (e.g., MCVD preform manufacturing) and fiber drawing. This stress and temperature resistance enables the nanostructure of the nanoparticles to maintain efficiency in the specified optical performances. The thermal treatment of step IV) strengthens the nanostructure of the nanoparticles after their incorporation by impregnation and before the steps of layer sintering and preform collapsing. The thermal treatment can be carried out at temperatures greater than or equal to 500° C. (e.g., about 800° C. or greater). In exemplary embodiments, the thermal treatment can be carried out at temperatures greater than 1000° C. (e.g., 1200° C. or greater). In some embodiments, the method of manufacturing an optical fiber can be applied to nanoparticles having a size of less than 25 nanometers.

In an exemplary embodiment of the method, alumina is transformed into more thermally resistant phases using a thermal treatment at temperatures of 1000° C. or more.

U.S. Patent Publication No. 2007/0108413, which is hereby incorporated by reference in its entirety, relates to the manufacturing of rare earth doped fluorinated multicomponent nanoparticles, which would not withstand the present thermal treatment.

French Patent No. 2,889,876, which is hereby incorporated by reference in its entirety, relates to a method for manufacturing rare earth doped nanoparticles dispersion and incorporating the nanoparticles into an optical fiber, but the disclosed method is most suitable for large nanoparticles.

The present invention is furthermore explained by way of the following, non-limiting example.

EXAMPLE

An erbium doped optical fiber for high efficiency amplification in the C-band may be obtained by the following method.

Initially, nanoparticles including erbium doping ions are prepared. Aluminum nitrate and erbium nitrate are co-precipitated in an aqueous solution whose pH is maintained at 9 using sodium hydroxide.

To guarantee the required dispersion of erbium doping ions in the alumina matrix of the nanoparticles, the erbium salt concentration is 3 mmoles/l and the molar ratio between aluminum salt and erbium salt is around 200. The dispersion produces erbium ions having a chemical environment sufficient to achieve the expected spectroscopic characteristics. The size of the precipitated nanoparticles is approximately 25 nanometers.

After precipitation and nanoparticle washing, pH is adjusted to 6 by adding of hydrochloric acid. A stable aqueous suspension of Al/Er co-doped nanoparticles with a known erbium concentration is obtained. This suspension is then used to impregnate the porous silica-based central core layer of a hollow silica tube obtained via MCVD process. The hollow tube is placed in an upright position and the suspension is poured into the hollow tube.

The refractive index difference between the central core and the cladding has been adjusted to $13 \times 10^{-3}$ by using germanium in the matrix of the central core. After the impregnation, excess suspension is removed from the hollow tube, and the tube is dried and thermally treated at a temperature of approximately 1100° C. for 1 hour to dry and strengthen the nanoparticle structure within the central core. The resulting doped core layer is sintered. The doped tube is then collapsed at a temperature of approximately 2200° C. to produce the primary preform, which is then sleeved to adjust the ratio of the diameter of the central core and the diameter of the optical cladding. The final preform is finally drawn into an optical fiber using a standard drawing technique.

An erbium doped fiber is obtained having an erbium attenuation of 6 dB/m at 1528 nanometers as measured by the maximum absorption, which corresponds approximately to 0.036 weight percent of erbium in the total core weight. The optical fiber has a cut-off wavelength of 1150 nanometers, a refractive index difference of $13 \times 10^{-3}$, a numerical aperture of 0.19, an MFD at 1550 nanometers of 5.6 micrometers and a central core diameter of 5 micrometer. The optical fiber presents low losses of 1.6 dB/km at 1220 nanometers. The pump confinement at 980 nanometers is equal to 90 percent, and the signal confinement is 70 percent.

The fiber presents high efficiency at high input signal power and can be used as a high power/low gain EDFA extender in the WDM C-band. The fiber allows saving up to 10 percent of pump power at 25 dBm output signal power. The fiber can also be used to reach unprecedented 26 dBm signal output power in a dual pump amplifying scheme involving two 750 mW 980-nanometer laser pumps.

This application incorporates entirely by reference the following commonly assigned patent application publications and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. Patent Application Publication No. US2009/0175583 A1 for a Microbend-Resistant Optical Fiber, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; U.S. patent application Ser. No. 12/436,423 for a Single-Mode Optical Fiber Having Reduced Bending Losses, filed May 6, 2009, (de Montmorillon et al.); U.S. patent application Ser. No. 12/436,484 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); and U.S. patent application Ser. No. 12/614,172 for a Multimode Optical System, filed Nov. 6, 2009, (Gholami et al.).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical prop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed on Nov. 9, 2009, (Overton); U.S. patent application Ser. No. 12/614,754 for Optical-Fiber Loose Tube Cables, filed on Nov. 9, 2009, (Overton); U.S. patent application Ser. No. 12/615,003 for a Reduced-Size Flat Drop Cable, filed on Nov. 9, 2009, (Overton et al.); U.S. patent application Ser. No. 12/615,106 for ADSS Cables with High-Performance Optical Fiber, filed on Nov. 9, 2009, (Overton); U.S. patent application Ser. No. 12/615,698 for Reduced-Diameter Ribbon Cables with High-Performance Optical Fiber, filed on Nov. 10, 2009, (Overton); U.S. patent application Ser. No. 12/615,737 for a Reduced-Diameter, Easy-Access Loose Tube Cable, filed on Nov. 10, 2009, (Overton).

In the specification and figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An amplifying optical fiber, comprising:
a central core comprising a silica matrix; and
an optical cladding surrounding the central core;
wherein the central core's silica matrix comprises nanoparticles, the nanoparticles comprising a matrix material that includes doping ions of at least one rare earth element;
wherein the concentration of the doping ions is between about 0.01 weight percent and 1 weight percent of the total weight of the central core; and
wherein, within at least one of the nanoparticles, the average distance between the doping ions is at least 0.4 nanometer.

2. An amplifying optical fiber according to claim 1, wherein the concentration of the doping ions is less than about 0.2 weight percent of the total weight of the central core.

3. An amplifying optical fiber according to claim 1, wherein, within at least one of the nanoparticles, the concentration of doping ions is between 0.1 and 20 weight percent.

4. An amplifying optical fiber according to claim 1, wherein, within at least one of the nanoparticles, the concentration of doping ions is between 0.5 and 15 weight percent.

5. An amplifying optical fiber according to claim 1, wherein, for more than 50 percent of the doping ions within the matrix material of at least one of the nanoparticles, the doping-ion separation is at least 0.4 nanometer.

6. An amplifying optical fiber according to claim 1, wherein, for 80 percent of the doping ions within the matrix material of at least one of the nanoparticles, the doping-ion separation is at least 0.4 nanometer.

7. An amplifying optical fiber according to claim 1, wherein, for 90 percent of the doping ions within the matrix material of at least one of the nanoparticles, the doping-ion separation is at least 0.4 nanometer.

8. An amplifying optical fiber according to claim 1, wherein, for substantially all of the doping ions within the matrix material of at least one of the nanoparticles, the doping-ion separation is at least 0.4 nanometer.

9. An amplifying optical fiber according to claim 1, wherein the matrix material of the nanoparticles has a phonon energy that is less than 20 percent of the energy gap between the amplifying level and ground state level of the rare earth element during pumping.

10. An amplifying optical fiber according to claim 1, wherein the matrix material of the nanoparticles has a phonon energy that is less than 15 percent of the energy gap between the amplifying level and ground state level of the rare earth element during pumping.

11. An amplifying optical fiber according to claim 1, wherein the matrix material of the nanoparticles has a phonon energy of (i) at least 25 percent of the energy gap between the pump level and the amplifying level of the rare earth element during pumping and (ii) at most 22 percent of the energy gap between the amplifying level and ground state level of the rare earth element during pumping.

12. An amplifying optical fiber according to claim 1, wherein the matrix material of the nanoparticles is amorphous.

13. An amplifying optical fiber according to claim 1, wherein the matrix material of the nanoparticles is alumina ($Al_2O_3$), phosphorus oxide ($P_2O_5$), or a combination thereof.

14. An amplifying optical fiber according to claim 1, wherein the silica-based matrix of the central core is doped with germanium, phosphorus, fluoride, boron, or combinations thereof.

15. An amplifying optical fiber according to claim 1, wherein the central core has a total concentration of alumina of about 4 weight percent or less based on the total weight of the central core.

16. An amplifying optical fiber according to claim 1, wherein the central core has a total concentration of alumina of about 3.5 weight percent or less based on the total weight of the central core.

17. An amplifying optical fiber according to claim 1, wherein the rare earth element comprises erbium, ytterbium, and/or thulium.

18. An amplifying optical fiber according to claim 1, wherein the rare earth element comprises erbium and ytterbium.

19. An amplifying optical fiber according to claim 1, wherein, at a wavelength of 1200 nanometers, the optical fiber has background attenuation losses of 4 dB/km or less.

20. An amplifying optical fiber according to claim 1, wherein, at a wavelength of 1200 nanometers, the optical fiber has background attenuation losses of 2 dB/km or less.

21. An amplifying optical fiber according to claim 1, wherein the size of the nanoparticles is less than about 100 nanometers.

22. An amplifying optical fiber according to claim 1, wherein the size of the nanoparticles is between about 2 nanometers and 50 nanometers.

23. An optical amplifier or an optical laser comprising at least a portion of the amplifying optical fiber according to claim 1.

24. A method for manufacturing an amplifying optical fiber according to claim 1, the method comprising:
   preparing a suspension of nanoparticles comprising a matrix material that includes doping ions of at least one rare earth element;
   providing a hollow silica-based tube having an inner porous layer prepared by a chemical vapor deposition (CVD) process;
   impregnating the inner porous layer of the silica-based tube with the suspension of nanoparticles to achieve a silica-based tube having a doped inner porous layer;
   applying heat to the silica-based tube's doped inner porous layer to eliminate residual water and strengthen the nanoparticles;
   thereafter vitrifying and collapsing the silica-based tube to obtain an optical preform; and
   thereafter drawing the optical preform to achieve an amplifying optical fiber.

25. A method for manufacturing an amplifying optical fiber according to claim 24, the method comprising, prior to the step of drawing the optical preform, sleeving or overcladding the optical preform to obtain an optical preform with modified ratio of central core diameter to optical cladding diameter.

26. A method for preparing a suspension of nanoparticles, comprising:
   (a) providing at least one compound comprising at least one ion of a rare earth element;
   (b) providing at least one compound comprising at least one ion to form the matrix material of the nanoparticles; and
   (c) adding the compounds obtained in step a) and step b) to an aqueous solution having a pH between about 3 and 12 under stirring to obtain the suspension of nanoparticles.

27. A method according to claim 26, wherein the suspension of nanoparticles obtained in step c) comprises nanoparticles in which the average distance between doping ions is at least 0.4 nanometer.

28. A method according to claim 26, wherein the suspension of nanoparticles obtained in step c) comprises nanoparticles in which the doping-ion separation is at least 0.4 nanometer for more than 50 percent of the doping ions.

29. A method according to claim 26, wherein:
   the at least one compound in step a) comprises erbium acetate, erbium nitrate, erbium acetylacetonate, erbium chloride, and/or other erbium salts; and
   the at least one compound in step b) comprises aluminum salts and/or phosphorus salts.

* * * * *